Nov. 18, 1941.　　　D. E. TRUCKSESS　　　2,263,320
POWER SUPPLY CIRCUIT EMPLOYING ELECTRICAL CONVERTERS
Filed Aug. 14, 1940
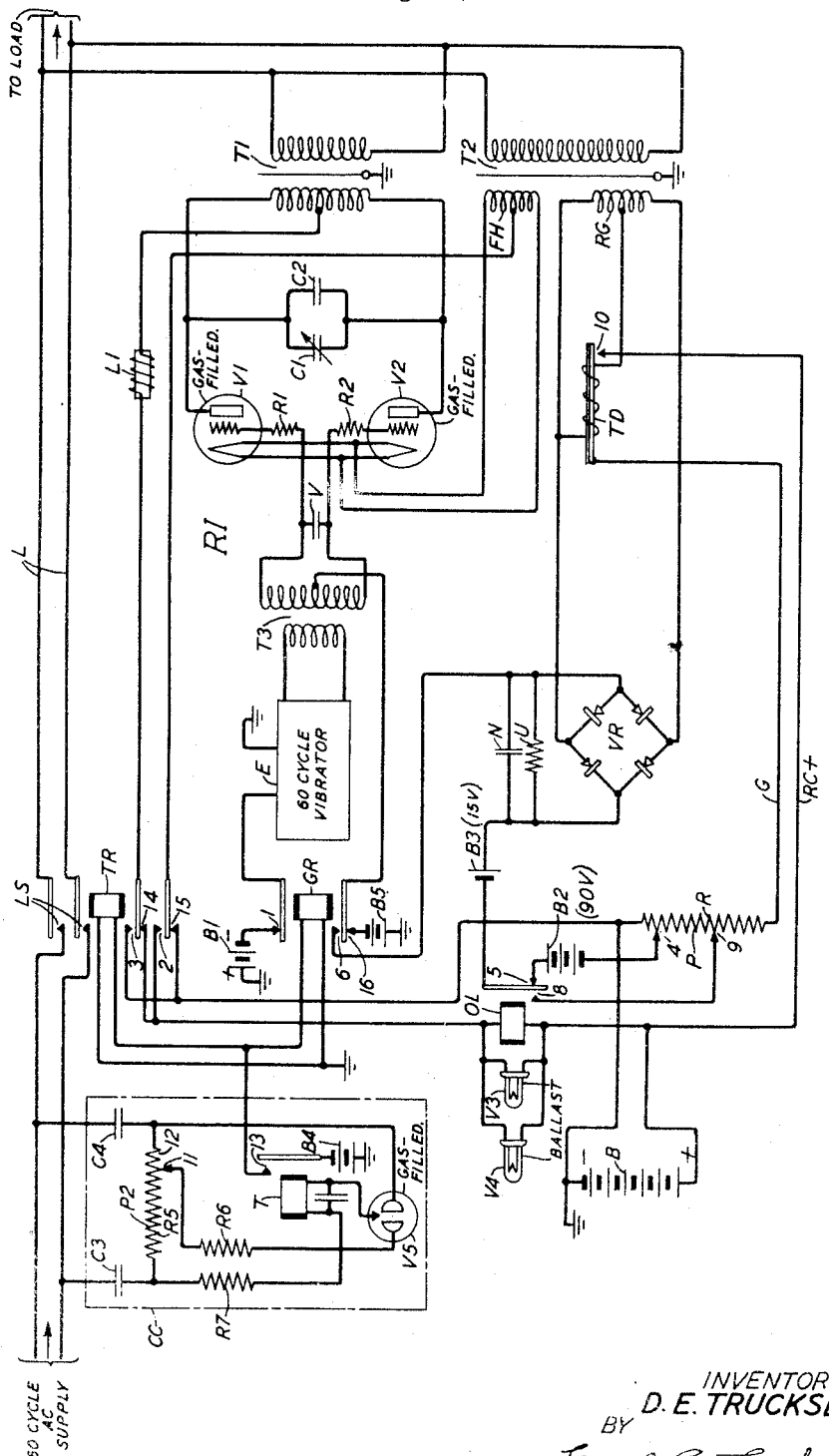
INVENTOR
D. E. TRUCKSESS
BY
Earl C. Laughlin
ATTORNEY Patented Nov. 18, 1941

2,263,320

UNITED STATES PATENT OFFICE 2,263,320

POWER SUPPLY CIRCUIT EMPLOYING ELECTRICAL CONVERTERS

David E. Trucksess, Summit, N. J., assignor to Bell Telephone Laboratories, Incorporated, New York, N. Y., a corporation of New York Application August 14, 1940, Serial No. 352,548

8 Claims. (Cl. 171—97)

The invention relates to power supply circuits and particularly to power supply circuits employing electrical converters.

An object of the invention is to convert alternating current power to direct current power and direct current power to alternating current power.

Another object is to automatically substitute a reserve source of alternating current power for a main source when the latter fails, and to utilize the main source when operative to replenish a direct current source for energizing the reserve alternating current generator.

These objects are attained in accordance with the invention by an electrical converter employing gas-filled discharge tubes, normally operating as a regulated rectifier to take alternating current power from a commercial alternating current power line supplying a load circuit, and produce therefrom direct current power to charge a storage battery, and operating when the alternating current line fails or its voltage is outside the tolerable limits, as an inverter to take direct current power from the storage battery and convert it to alternating current power of the desired frequency and voltage, for supplying the load circuit.

A feature of the invention is the use in combination with a circuit for regulating the output voltage of the rectifier in the above described system, employing non-linear resistance elements, such as ballast lamps, connected in series with the direct current load and across the control grid circuits of the rectifier tubes, to cause a rapid increase in the negative biasing potential on the control grids of the tubes for loads in excess of a predetermined limit, of a control circuit responsive to the voltage drop produced across the non-linear resistance elements by a given increase in the load above that limit to change the regulation produced by the regulating circuit from voltage regulation to current regulation to prevent the rectifier from being overloaded by the applied alternating current for such load conditions.

The various features and objects of the invention will be better understood from the following detailed description when read in conjunction with the accompanying drawing, the single figure of which shows schematically a power supply circuit for a carrier telephone system, embodying a preferred form of the invention.

In the circuit of the drawing, the commercial 60-cycle alternating current power line L serves as the regular alternating current supply for a load (not shown), which may be the power-operated apparatus in a carrier telephone system, being connected to the load when the alternating current supply voltage is normal through the closed line switches LS, by the operation of control relay TR. A reserve source of power includes the storage battery B and an electrical converter RI adapted to operate either as a regulated alternating current rectifier or as a direct current inverter.

The converter RI includes as main elements the two three-electrode thyratron (gas-filled) discharge tubes VI and V2 having their control grid-cathode circuits and their plate-cathode circuits respectively connected in push-pull relation; the source E of 60-cycle exciting voltage, which may be a 60-cycle vibrator, coupled to the control grid-cathode circuits of the tubes VI and V2 through transformer T3; commutating condensers CI, C2 connected between the plates of the tubes VI and V2; a plate transformer TI having its primary winding connected across the line L and its secondary winding connected between the plates of the tubes VI and V2; a transformer T2 having a primary winding connected across the line L, one secondary winding FH for supplying heating current to the filaments of the tubes VI and V2, and a second secondary winding RG operating as a regulating winding; and a regulating circuit including the varistor VR and the thermal time delay relay TD, controlled from winding RG for regulating the output of the converter RI when it is used as a rectifier.

The switching of the circuits of converter RI to change from rectifier to inverter operation, and the switching of the load between the regular and the reserve sources of alternating current power, are made by control relays TR and GR under control of control circuit CC.

The turn ratio of the windings of the plate transformer TI is selected to provide the proper secondary voltage applied to the plates of the tubes VI and V2 for rectifier operation, so that the tubes will deliver the desired output voltage for charging the storage battery B. As the transformer TI functions also as the plate transformer for the converter RI when used as an inverter, it must deliver the proper alternating current output voltage to the load. This is arranged by suitable adjustment of the power factor of the plate circuits VI and V2 of the tubes, for example, by providing a greater capacitance in the commutating condensers CI, C2 than would ordinarily be required to accommodate the tubes for inverter operation.

Rectifier operation

The connections of the converter R1 with the control relays TR and GR operated are such as to provide for its operation as a rectifier, which is the normal condition, that is, the condition when the alternating current supply over the power line L to the load is within the desired voltage limits. In that condition, the 60-cycle alternating current supply is delivered over line L to the load through the line switches LS which are in the closed condition due to the operated condition of the control relay TR therefor. Also, the 60-cycle exciter source E is effectively disconnected from the control grid-cathode circuits of the tubes V1 and V2 due to the break in the energizing circuit therefor from battery B1, provided by the open condition of relay contacts 1 of the operated control relay GR. The secondary winding of transformer T3 then appears only as a direct current resistance of a few ohms in series with the high resistance of the grid resistors R1 and R2, which is insignificant in its operation.

The 60-cycle alternating current supply over the line L supplies the proper plate voltage for rectifier operation to the plates of the tubes V1 and V2 through the plate transformer T1, and supplies the heating current for the filaments of the tubes V1 and V2 through the filament heating winding FH of transformer T2. The direct current output of the tubes V1 and V2 is filtered by the retardation coil L1 in the common plate lead. The direct current output leads of tubes V1 and V2 are carried through the lower switch contacts of relay TR. The alternating current input to the tubes V1 and V2 is through the line switches LS in line L to the primary windings of the plate and filament transformers T1 and T2. For rectifier operation, the positive charge lead of the storage battery B is connected through the parallel ballast lamps V3 and V4 and the closed lower front contact 2 and armature of relay TR to the center tap of the secondary filament heating winding FH of transformer T2. The negative charge lead of battery B is connected through the closed lower front contact 3 and armature of relay TR and the retardation coil L1 to the center tap of the secondary winding of the plate transformer T1.

The voltage of the output current of the converter R1 operating as a rectifier is controlled by the regulating circuit. The regulating leads RC+ and G are connected to the point at which the voltage is to be regulated. The RC+ lead is connected to the positive terminal of the battery B and lead G is connected to the negative battery terminal. These leads connect to the potentiometer P the total resistance R of which is connected across battery B. The potentiometer P provides a negative voltage to the grid circuits of the tubes V1 and V2, with respect to the cathodes of the tubes. This negative voltage is taken off at the variable tap 4 of potentiometer P and is opposed by the 90-volt grid battery B2, through the normally made back contact 5 of the relay OL and the 15-volt grid battery B3 to the varistor VR, closed lower contact 6 and armature of the operated relay GR to the center tap of the secondary winding of grid transformer T3, through the upper and lower halves of that winding and grid resistors R1 and R2 to the grids of the tubes V1 and V2. The potentiometer P provides a negative grid voltage from the battery B being charged. This voltage is opposed by the 15-volt and 90-volt grid batteries B3 and is increased by the voltage provided by the varistor VR so that the net voltage applied to the grids of the tubes V1 and V2 is in the order of —1.5 volts.

If a load is applied to the battery B being charged, the voltage provided by potentiometer P decreases in magnitude and this change in voltage is reflected through the series grid circuits to the grids of the tubes V1 and V2, since the grid battery and varistor voltages are constant. A less negative bias on the tubes will increase their direct current output current to compensate for the increase in load, which returns the voltage of battery B to approximately the original value. As load is applied, the net negative grid voltage is reduced to a small value at which point the tubes V1 and V2 begin to operate as two-element rectifier tubes and produce the maximum output current. If the load on the battery B is reduced, the battery voltage will increase a small amount thus increasing the net grid voltage which reduces the output currents of the tubes V1 and V2. In this way, the charging current produced by the converter R1 operating as a rectifier is controlled so that it delivers sufficient current to carry the load plus a small trickle current as required by the battery B.

If the load exceeds the capacity of the rectifier, the voltage regulating circuit REG will attempt to equal it and overload the rectifier. To prevent this, the relay OL and the parallel ballast lamps V3 and V4 are provided to convert the circuit from voltage to current regulation. The current value at which the circuit regulates is a function of the amperage rating of the ballast lamps selected. The two ballast lamps used in this particular circuit had a rating of 5 amperes each. These ballast lamps V3 and V4 have the characteristics of a small voltage drop at light loads and a rapidly increasing voltage drop at full load. When the output current of the rectifier reaches the regulating range of the ballast lamps the voltage drop increases rapidly until the marginal relay OL operates. Operation of the relay OL to contact 8 transfers the grid circuits of tubes V1 and V2 from the 90-volt grid battery B2 and the voltage potentiometer P at the upper tap 4 to the same potentiometer circuit at a lower voltage through the lower tap 9 of P. With this circuit connection the varying voltage drop of the ballast lamps V3 and V4 is connected effectively to the grid circuits of the tubes V1 and V2.

If the output current of the rectifier tends to increase, this ballast lamp voltage drop is introduced into the grid circuits because the lamps are connected to the cathodes of the tubes V1 and V2 by way of contact Z of operated relay TR through the center tap on the filament supply winding FH of transformer T2. The return circuit is through the RC+ regulating lead which is connected to the plus terminal of the battery B, to the plus charge lead, back to the other side of the ballast lamps V3 and V4.

An increase in load increases the voltage drop over the ballast lamps V3 and V4, which increases the negative bias on the control grids of the tubes V1 and V2, which is in a direction to decrease the output current of the rectifier. In this way, the rectifier circuit output current reaches a balance when the output current produces a voltage drop over the ballast lamps V3 and V4 which is the proper negative bias to provide the desired output current. If the load decreases to less than the rated output of the rectifier, the voltage of the battery B being charged will increase. When the current regulating circuit has not sufficient margin to maintain the current at the regulated value, the voltage drop over the ballast lamps V3 and V4 will begin to decrease until the relay OL releases which returns the grid circuits of tubes V1 and V2 to the voltage regulating condition, and the output current of the rectifier will then be adjusted to provide the regulating voltage.

In order to assist the rectifier to compensate for changes in the alternating current line voltage, the regulator winding RG is provided on the transformer T2, which provides 8½ volts alternating current to the varistor VR. The varistor VR rectifies this alternating current voltage to about 9 volts direct current, which is filtered by the condenser N, and a dummy load U consisting of a 1000 ohms resistance is provided across the condenser. This direct current voltage is connected into the grid circuits of the tubes V1 and V2, and its magnitude is such that a change in the line voltage changes the control grid bias on the tubes V1 and V2 sufficiently and in a direction to compensate for the corresponding change of the alternating current voltage applied to the plates to these tubes through transformer T2.

It is necessary to prevent the tubes V1 and V2 from carrying current until the filaments are hot and the rectifier started. The thermal time delay relay TD operated from the upper portion of the winding RG of transformer T2 is used for accomplishing this. When the alternating current voltage is applied to the primary winding of relay T2, the voltage drop (5 volts) in the upper portion of winding RG is applied to the heater winding of the relay TD. Because of the operating time delay provided by proper design of the relay TD, the contacts 10 will close to condition the regulating circuits for operation after a delay of, say, 45 seconds. With these contacts closed, the control grids of the tubes V1 and V2 are connected through the regulating circuit to the negative terminal of the battery B through the resistance R of the potentiometer P and the regulating lead G. This negative voltage when applied to the grids of the tubes V1 and V2 prevent the latter from carrying current.

The control of the circuits of the converter RI to change it from rectifier operation to inverter operation when the alternating current power supply over the line L fails or its voltage drops outside the allowable limits, is accomplished by the alternating current control circuit CC, which is essentially as disclosed in the United States patent to C. S. Knowlton No. 2,197,868, issued April 23, 1940. The circuit CC comprises a potentiometer P2 the total resistance R5 of which is bridged across the line L at a point in front of the line switches LS, through condensers C3 and C4, and a three-element cold cathode, gas-filled discharge tube V5 having the control discharge gap between its control electrode and cathode connected by adjustable tap 11 across a portion 12 of potentiometer resistance R5, through resistance R6, and its main discharge gap between the anode and cathode connected across the line L in series with resistance R7 and the winding of the direct current relay T through condensers C3 and C4.

When the regular power service voltage in line L is within the allowable limits, the voltage drop across the portion 12 of resistance potentiometer R5 is sufficient to break down the control electrode-cathode discharge gap of tube V5. This allows current to flow through the main cathode-anode gap of tube V5 and the winding of relay T, from the junction of the resistances R5 and R7. Because of the characteristics of the tube V5, this current is unidirectional and causes relay T to operate to close its switch contacts 13 connecting battery B4 to the windings of the relays TR and GR. Relay TR then operates to close the line switches LS to connect the regular alternating current supply source to the load over line L, and to close its lower contacts 2 and 3 to connect the direct current output leads of the tubes V1 and V2 in charging relation to the battery B; and relay GR operates to break the energizing circuit for the 60-cycle exciter G and to make the other connections required for completing the conditioning of the converter RI for rectifier operation as previously described above.

*Inverter operation*

Now, if the regular power service voltage in the line L fails or changes to a value outside the allowable limits, the voltage across the portion 12 of potentiometer resistance R5 in control circuit CC, connected across the control grid cathode circuit of tube V5 will not be sufficient to fire the tube and current will cease to flow in the winding of relay T. Relay T will then release opening its contacts 13 and disconnecting battery B4 from the windings of the relays TR and GR so that these relays will release to make the proper connections for converting the converter RI from a rectifier to an inverter to supply the load in the following manner.

The release of relay TR opens line switches LS to disconnect the regular alternating current supply over line L from the load and returns the lower armatures to the back relay contacts 14 and 15, reversing the poling of battery B with respect to the plate-cathode circuits of tubes V1 and V2 so that the battery now supplies the proper plate voltages for inverter operation.

The release of relay GR to return its upper armature to contact 1 connects the 24-volt energizing battery B1 to the 60-cycle vibrator E; breaks its lower front contact 6 to disconnect the control grids of the tubes V1 and V2 from the regulating circuit, and makes lower back contact 16 to connect the center tap of the grid transformer T3 to the negative 24-volt battery B5, so that a negative voltage from the latter battery is applied continuously to the control grids of the tubes V1 and V2, and the 60-cycle pilot frequency from the exciter E is superposed on this negative voltage through transformer T3. The condenser V connected across the secondary winding of the transformer T3 serves to by-pass spurious high frequency voltages from the control grids of the tubes V1 and V2.

With the 60-cycle exciting voltage applied to the control grids of the tubes V1 and V2, the first cycle at which the grid of tube V1, for example, is driven to a small negative value, since the alternating current voltage is greater in magnitude than the direct current voltage applied to this grid, the tube V1 will fire. Current will then flow from battery B over a circuit extending from its positive terminal through the retardation coil L1 to the center tap of the plate winding of transformer T1, through the upper half of that winding, the plate-filament discharge path of tube V1, back to the negative terminal of battery B by way of the negative charge lead. The tube V1 thus acts as an electronic switch. The current flow over this path will continue until the 60-cycle pilot frequency from exciter E has changed its polarity and drives the control grid voltage of the tube V2 to a small negative value at which the latter tube fires. The switching action of tube V2 will cause current to flow from battery B over a circuit extending from the positive terminal of that battery through retardation coil LI to the center tap of the plate winding of transformer TI, the lower half of that winding and through the plate-filament discharge path of the tube V2 and back to the negative terminal of the battery B by way of the negative charge lead. When this occurs, the charge which was stored in the commutating condensers CI, C2 by the operation of tube VI, is applied with such polarity to the plate of the tube VI as to drive it negative with respect to its cathode and thus extinguishes the tube VI. This process is repeated periodically under control of the 60-cycle pilot frequency from vibrator E to produce alternate surges of current through the opposite halves of the plate winding of the transformer TI. These surges of current generate an alternating current voltage in the primary of transformer TI which is supplied to the load. Part of this voltage is fed back through the primary of transformer T2 and is induced in the winding FH of that transformer to maintain the filaments of the tubes VI and V2 hot.

The converter RI will continue to operate as an inverter to supply the load until the regular alternating current supply over the line L returns to its normal voltage condition when relay T of the control circuit CC will again be operated to cause the energization of the windings of the switching relays TR and GR. The latter relays will then reconnect the regular alternating current supply over line L to the load, and to rearrange the circuits of the converter RI so that it again operates as a rectifier to take alternating current voltage from the line L and produce direct current energy therefrom to charge the storage battery B, in the manner previously described.

Various modifications of the circuits illustrated and described which are within the spirit and scope of the invention will occur to persons skilled in the art.

What is claimed is:

1. An electrical converter operative alternatively as a rectifier to convert alternating current from a primary source for supplying a load circuit to direct current to charge a battery, and as an inverter to convert direct current received from that battery to alternating current to supply said load circuit, said converter comprising main circuit elements common to both types of operation including an electric space discharge device having discharge electrodes and a discharge control electrode, and circuits therefor, and means connecting the discharge circuit of said device to said primary source, said load circuit and said battery, and other circuit elements for controlling the poling of said battery with respect to the discharge electrodes of said device, and the voltages applied to said discharge electrodes and said discharge control electrode so as to make said device function either as a rectifier or as an inverter.

2. An electrical converter operative as a rectifier to transform alternating current received from a primary source supplying a load circuit, to direct current to charge a storage battery, and when said primary source fails, operative as an inverter to convert direct current from said battery to alternating current to supply said load circuit, said converter comprising one or more gas-filled electric space discharge tubes each having a cathode, an anode and a discharge control electrode, and circuits therefor, transformer means coupling the anode-cathode circuits of said tubes in transmission relation with said primary source and said load circuit, and connecting said battery in the anode-cathode circuits of said tubes, and means responsive to the voltage condition of said primary source for controlling the voltages on the anodes and control electrodes of said tubes, and the poling of said battery with respect to said anodes so that each of said tubes operates as a rectifier when the primary source voltage is normal and as an inverter when it fails.

3. In combination, a primary source of alternating current power, a load circuit supplied from said primary source, a storage battery, an electrical converter employing gas-filled electron discharge tubes normally operating as a regulated rectifier to convert alternating current supplied thereto from said primary source to direct current to maintain said storage battery in the charged condition, and means automatically responsive to certain voltage conditions of said primary source to disconnect said load circuit therefrom, and to cause said converter to operate as an inverter to convert direct current energy received from said battery to alternating current, and to supply the alternating current thus produced to said load circuit.

4. The electrical converter of claim 1, in which said main circuit elements comprise two electron discharge devices each having a cathode, an anode and a control electrode, and circuits therefor, a plate transformer coupling the anode-cathode circuits of said devices to said load circuit, and relay means adapted to be energized by said primary source, and the other circuit elements include a commutating capacitor connected between the anodes of said devices and a second source of alternating current voltage of the same frequency as said primary source, said relay means when the voltage of said primary source is normal operating to connect that source to said load circuit, to the anode-cathode circuits of said discharge devices through said plate transformer to provide the proper anode voltages for rectifier operation and to connect said battery to said anode-cathode circuits with such polarity that the rectified output of said devices charges said battery, said relay means operating when the voltage of said primary source is abnormal to disconnect that source from said load circuit, to reverse the poling of said battery so that it supplies the necessary potentials to the anodes of said devices for inverter operation, and to cause an alternating current exciting voltage from said second source to be applied in common to the control electrode-cathode circuits of said devices, for controlling the firing and extinguishing times of said tubes as commutated by said commutating capacitor, to produce an alternating voltage of the same frequency in said transformer to feed said load circuit.

5. The electrical converter of claim 1, in which the circuit elements comprise two electron discharge tubes each having a heated filament, a plate and a control grid, and circuits therefor, the plate-filament circuits and the grid-filament circuits of said tubes being respectively connected in push-pull relation, a commutating capacitor connected between the plates of said tubes, a common transformer functioning both as the plate transformer of the tubes used as a rectifier and as the plate transformer for the tubes used as an inverter, the turn ratio of said transformer being selected to provide the proper secondary voltage applied to the plates of the tubes for rectifier operation to deliver the desired direct current output, means for making the power factor of the plate circuits of said tubes such that said transformer will deliver the proper alternating output voltage for inverter operation, a source of exciting alternating current voltage of the same frequency as said primary source, and relay means which in one condition of operation connects said primary source to said load circuit, and to the plate-filament circuit of said tubes, through said transformer to produce rectifier operation and connects said battery in common to the plate-filaments of said tubes with the proper poling so that the direct current output thereof charges said battery, and in another condition of operation disconnects said primary source from said load circuit, reverses the poling of the battery so that it supplies the necessary potentials to the plates of the tubes for inverter operation, causes alternating current from said exciting source to be applied to the control grids of said tubes to control their firing and extinguishing times as commutated by said capacitor to produce an alternating current voltage of the same frequency in said transformer to feed said load circuit.

6. In combination, an alternating current supply, a rectifier consisting of an electron discharge rectifying device having a control grid circuit, for rectifying alternating current received from said supply, a variable direct current load supplied with the rectified current produced by said rectifier, a circuit for automatically regulating the current supply to said load, comprising a non-linear resistance device connected across said control grid circuit and in series with said load, said non-linear device providing a substantially constant biasing potential on the control grid of said device for direct current loads up to a predetermined limit and a rapidly increasing negative biasing potential thereon for loads above said limit, and means to prevent the overloading of said rectifier by the alternating current supply when the direct current load exceeds the capacity of said rectifier comprising means responsive to the voltage drop produced in said non-linear resistance device for that condition to change said regulating circuit from voltage regulation to current regulation.

7. The combination of claim 6, in which the last-mentioned means comprises a marginal relay having its operating winding connected across said non-linear resistance device, and means responsive to operation of said relay to decrease the negative bias applied to said control grid circuit.

8. The electrical converter of claim 1, in which the circuit elements comprise two gas-filled electron discharge tubes connected in push-pull relation, each having a filament, a plate and a control grid, and circuits therefor, a commutating capacitor connected between the plates of said tubes, a plate transformer having one winding connected between the plates of said tubes and the other winding connected to said load circuit, a filament transformer having one secondary winding across the filaments of said tubes, a second secondary winding and a primary winding, a rectifier regulating circuit connecting said second secondary winding to the control grid-filament circuits of said tubes, a second source of alternating current of the same frequency as that produced by said primary source, and relay means controlled from said primary source, which when the voltage of the latter is within tolerable limits operates to connect said primary source to said load circuit, and to the primary winding of said second transformer and said other winding of said plate transformer to supply filament and plate excitation and regulating currents to said tubes so that they operate as two-element regulated rectifiers to rectify alternating current supplied from said primary source, and to connect said battery to the plate circuits of said tubes with such poling that the battery is charged by the rectifier output current, said relay means when the voltage of said primary source is outside said tolerable limits operating to disconnect said primary source from said load circuit, to disable said regulating circuit, to reverse the poling of said battery so that it supplies plate and filament excitation to said tubes for inverter operation, and to cause alternating exciting voltages from said second source to be applied to the control grid circuits of said tubes to control the firing and extinguishing times thereof as commutated by said capacitor, so as to produce alternating current of said frequency in said plate transformer to feed said load circuit.

DAVID E. TRUCKSESS.